(12) United States Patent
Faske

(10) Patent No.: US 8,672,300 B2
(45) Date of Patent: Mar. 18, 2014

(54) FUEL EVAPORATOR

(76) Inventor: James Earl Faske, Port Saint Lucie, FL (US)

( * ) Notice: Subject to any disclaimer, the term of this patent is extended or adjusted under 35 U.S.C. 154(b) by 376 days.

(21) Appl. No.: 13/283,489

(22) Filed: Oct. 27, 2011

(65) Prior Publication Data

US 2013/0106005 A1 May 2, 2013

(51) Int. Cl.
*F02M 31/18* (2006.01)

(52) U.S. Cl.
USPC ....... 261/78.1; 261/119.2; 261/152; 261/153; 261/DIG. 55; 261/DIG. 83

(58) Field of Classification Search
USPC ............ 261/78.1, 78.2, 119.2, 152, 153, 155, 261/156, DIG. 55, DIG. 83
See application file for complete search history.

(56) References Cited

U.S. PATENT DOCUMENTS

| | | | | | |
|---|---|---|---|---|---|
| 1,703,914 | A | * | 3/1929 | Whiteman | 261/152 |
| 1,814,402 | A | * | 7/1931 | Mullen, Jr. | 261/130 |
| 2,009,919 | A | * | 7/1935 | Graziano | 261/139 |
| 2,026,798 | A | * | 1/1936 | Pogue | 261/131 |
| 2,073,649 | A | * | 3/1937 | Price | 261/155 |
| 2,267,722 | A | * | 12/1941 | Ericsson | 261/155 |
| 2,339,105 | A | * | 1/1944 | Pickering | 261/133 |
| 2,362,163 | A | * | 11/1944 | Shipman | 261/146 |
| 3,332,476 | A | * | 7/1967 | McDougal | 165/51 |
| 4,153,651 | A | | 5/1979 | Mears, Jr. | |
| 4,401,095 | A | | 8/1983 | DuLoft | |
| 4,412,521 | A | | 11/1983 | Silva, Jr. | |
| 5,140,966 | A | * | 8/1992 | Wong | 123/543 |
| 6,729,609 | B2 | * | 5/2004 | Winch | 261/152 |
| 8,308,144 | B2 | * | 11/2012 | Saito | 261/35 |
| 2002/0105101 | A1 | * | 8/2002 | Menzel et al. | 261/152 |

FOREIGN PATENT DOCUMENTS

| | | | | | |
|---|---|---|---|---|---|
| JP | 59-74361 | A | * | 4/1984 | 261/155 |
| JP | 59-74362 | A | * | 4/1984 | 261/152 |
| JP | 60-56157 | A | * | 4/1985 | 261/152 |

\* cited by examiner

*Primary Examiner* — Richard L Chiesa

(57) ABSTRACT

A modified carburetor allows the fuel and air input ratio to be adjusted by varying the opening sizes in the carburetor. After the proper air opening size is determined and set, the fuel jet setting can be adjusted for cold starts and/or to fine tune the engine. The air opening setting may remain the same, regardless of engine speed. This allows the engine to create a vacuum of near zero to five inches of mercury or more, depending on the speed of the engine. A small air input opening setting may be used for the engine to create this vacuum. The higher the vacuum created, the better the fuel efficiency. The fuel from the modified carburetor then flows through a heated evaporator chamber that maintains this vacuum. This enhances and completes the evaporation process as the fuel passes through and over metal shavings toward the engine.

10 Claims, 3 Drawing Sheets

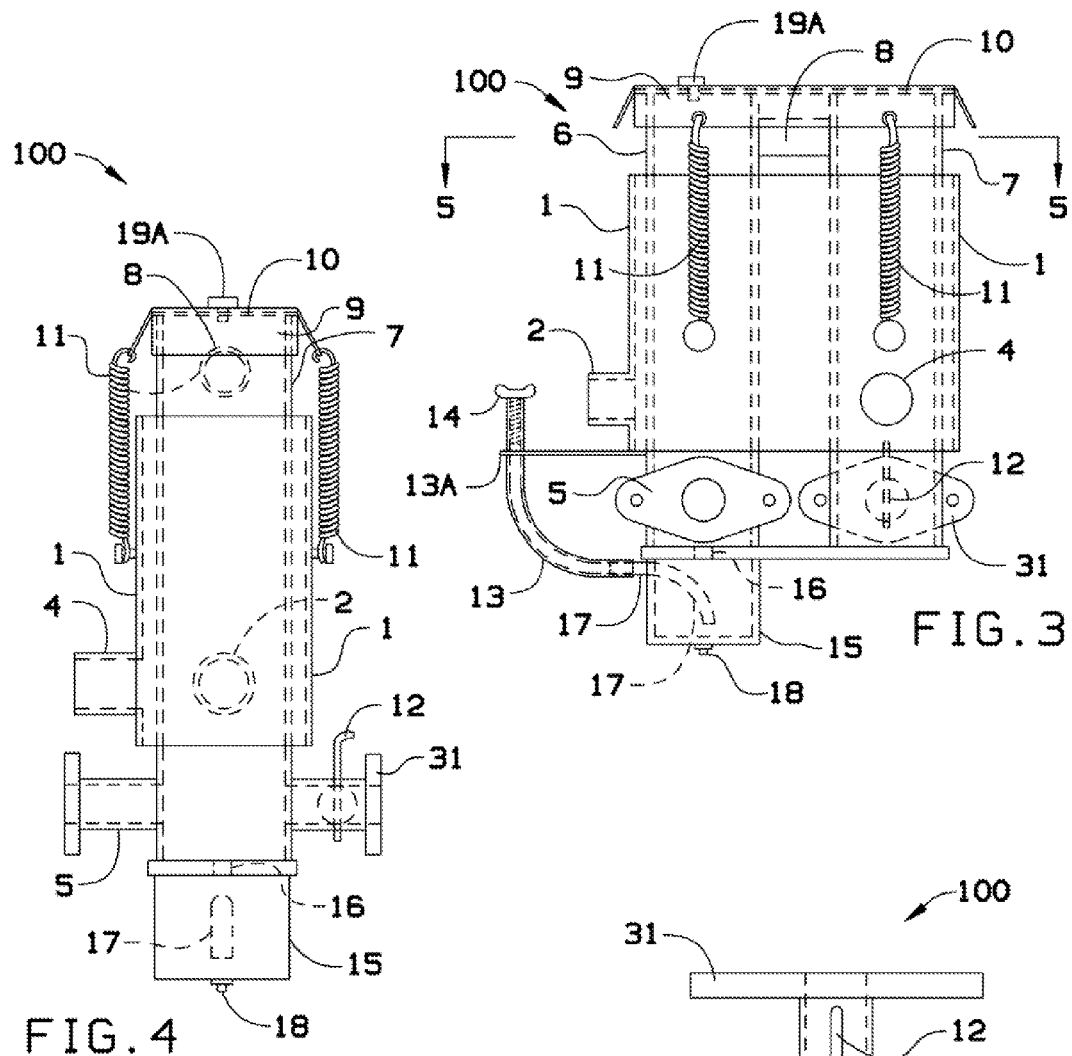
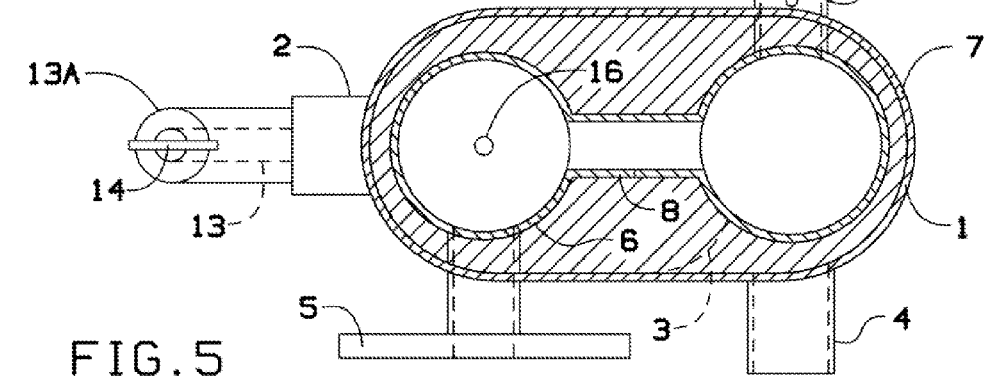
FIG. 3
FIG. 4
FIG. 5

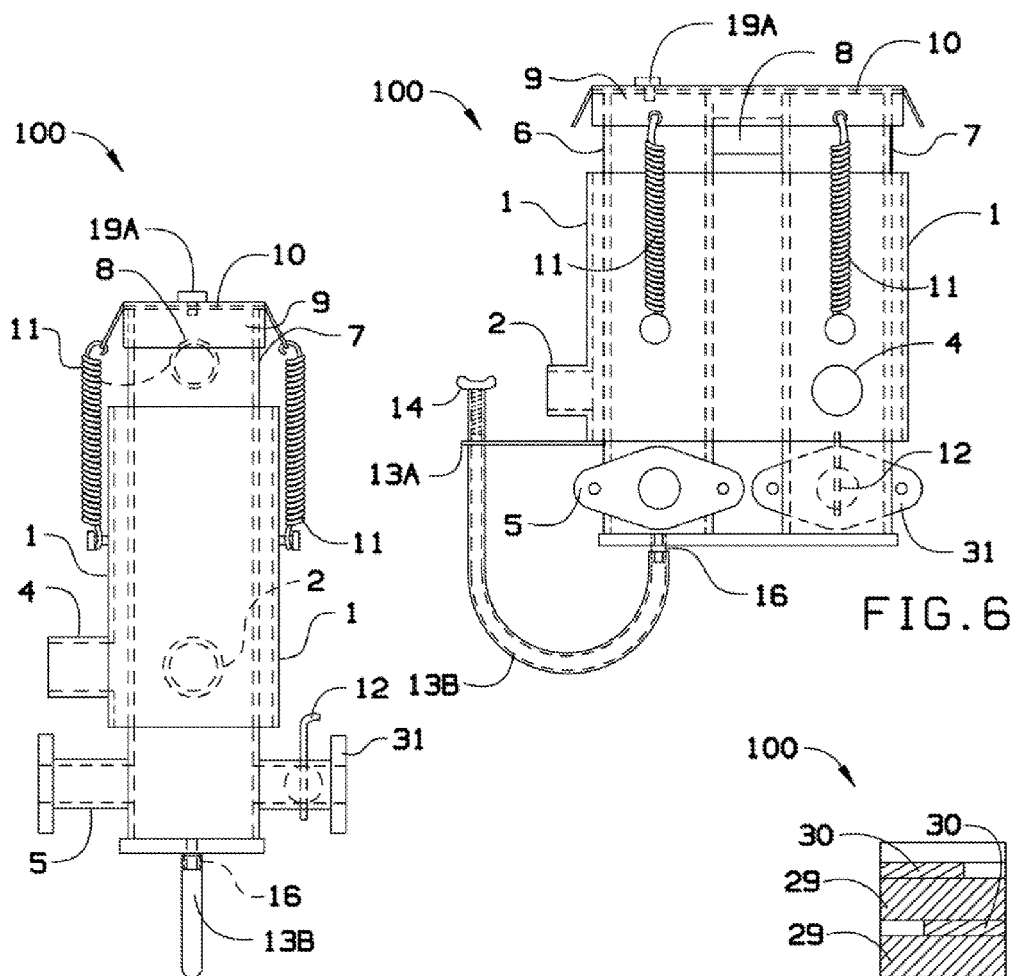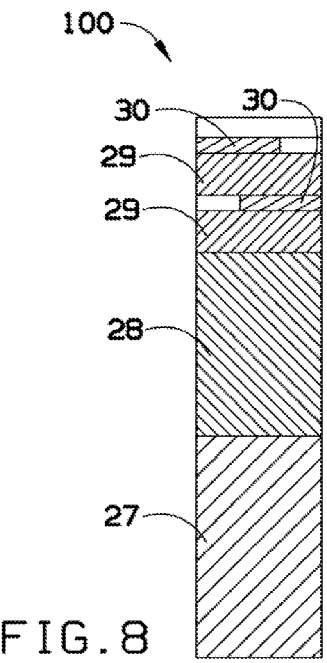

FUEL EVAPORATOR

BACKGROUND OF THE INVENTION

The present invention relates to a fuel evaporator and, more particularly, to a fuel evaporator where an engine connected to the evaporator can create a vacuum.

With a standard modern carburetor, the amount of fuel entering the engine depends on the velocity of air flowing over a variable jet and through a variable air opening at or near the current barometric pressure, being very inefficient.

An example of an evaporator type carburetor is that of U.S. Pat. No. 2,026,798, issued to Pogue. These evaporator carburetors may be complicated, large and difficult to construct. In addition, these evaporator carburetors may not readily accelerate an engine and may not provide enough power under load. Finally, with evaporator carburetors, additives in fuel may eventual clog the coils.

As can be seen, there is a need for a fuel evaporator that may solve the concerns with prior art engines, carburetors and evaporators.

SUMMARY OF THE INVENTION

In one aspect of the present invention, a fuel evaporator comprises a heat jacket; a fuel evaporation chamber disposed in the heat jacket; a heat input tube adapted to deliver heat into the heat jacket; a carburetor attachment port adapted to receive a fuel air mixture from a modified standard carburetor; and a reservoir-agitator adapted to provide additional fuel to the fuel evaporation chamber when needed.

In another aspect of the present invention, a system for delivering a fuel-air mixture to an engine comprises a carburetor having a fuel ratio adjustment nut to adjust a needle valve to regulate flow of fuel; an air ratio adjustment nut to adjust the flow of air through the carburetor; and a fuel container adapted to store fuel; and a fuel evaporator having a heat jacket; a fuel evaporation chamber disposed in the heat jacket; a heat input tube adapted to deliver heat into the heat jacket; a carburetor attachment port adapted to receive a fuel air mixture from the carburetor; and a reservoir-agitator adapted to provide additional fuel to the fuel evaporation chamber when needed.

These and other features, aspects and advantages of the present invention will become better understood with reference to the following drawings, description and claims.

BRIEF DESCRIPTION OF THE DRAWINGS

FIG. 3 is a front view of the fuel evaporator of FIG. 1;

FIG. 4 is a right side view of the fuel evaporator of FIG. 1;

FIG. 5 is a section view taken along line 5-5 of FIG. 3;

FIG. 6 is a front view of a fuel evaporator according to an alternate exemplary embodiment of the present invention;

FIG. 7 is a right side view of the fuel evaporator of FIGS. 6; and

FIG. 8 is a section view of a fuel evaporation chamber used in the fuel evaporator of either FIG. 1 or 6.

DETAILED DESCRIPTION OF THE INVENTION

Figure 1:
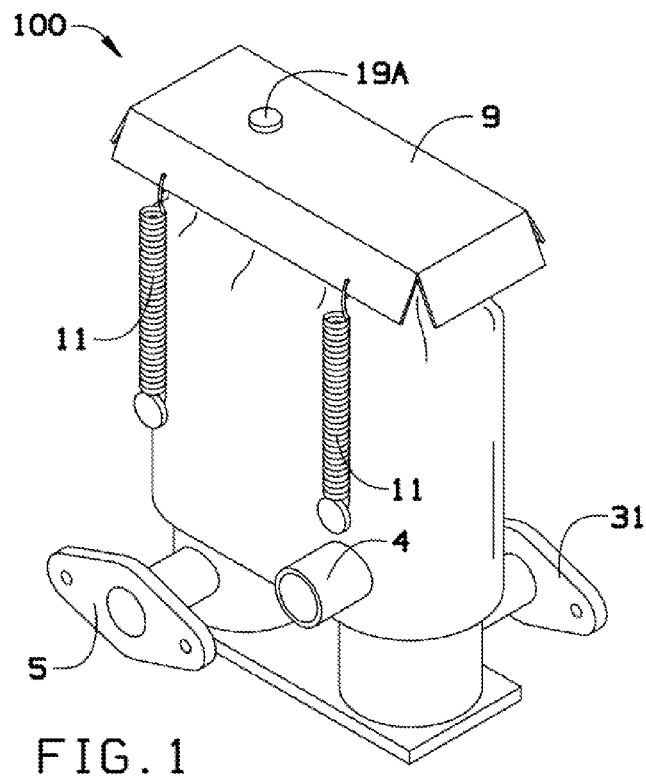
FIG. 1 is a perspective view of a fuel evaporator according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a modified carburetor that allows the fuel and air input ratio to be adjusted by varying the opening sizes in the carburetor. After the proper air opening size is determined and set, the fuel jet setting can be adjusted to cold start the engine and/or to fine tune the engine. The air opening setting may remain the same, regardless of engine speed. This allows the engine to create a vacuum of near zero to five inches of mercury or more, depending on the speed of the engine. A small air input opening setting may be used for the engine to create this vacuum. The higher the vacuum created, the better the fuel efficiency. An engine using the system of the present invention may run more efficiently at high speed than at low speed. This concept has been shown where a 148 cc engine modified with the system of the present invention may run for four minutes on one ounce of fuel at idle speed and five minutes at 4000-5000 rpm.

Referring now to FIGS. 1 through 8, a fuel evaporator 100 may include a heat jacket 1 that may collect heat and direct it around a fuel evaporation chamber 6 and a evaporated gas storage chamber 7. The storage chamber 7 may be optional and, in the case without the storage chamber 7, the heat jacket 1 may direct heat around the fuel evaporation chamber 6. A heat input tube 2 may deliver heat inside the heat jacket 1. Baffles 3 may distribute the heat. A heat exhaust tube 4 may permit the heat to exit the heat jacket 1.

Figure 2:
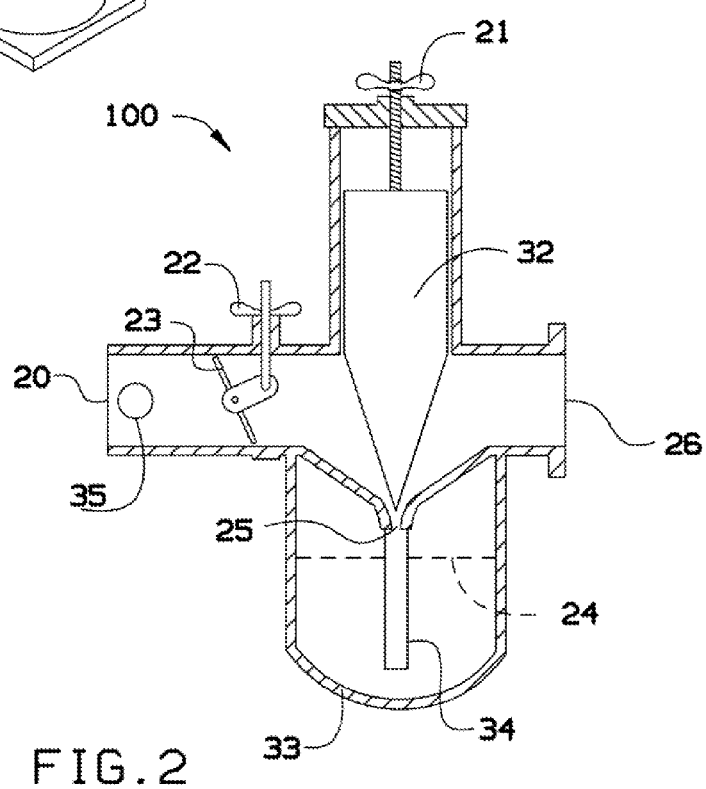
FIG. 2 is a section view of a modified carburetor.

Fuel may be mixed with the proper amount of air in a modified carburetor as shown in FIG. 2. The mixture may be drawn into port 5 to be further evaporated by the fuel flowing over metal shavings 27, 28 in the chamber 6. As heat is applied to the heat jacket 1, it heats the metal shavings 27, 29 and enhances the evaporation process. The evaporated gas then flows through a connecting tube 8 to the chamber 7 and stored for use as needed by the engine.

When the engine is accelerated, it creates a greater vacuum in chambers 6, 7, causing more fuel to be drawn in from a fuel reservoir-agitator 15 or 13b (as discussed in greater detail below) through an orifice 16. An air resistance plug 14 may provide air resistance so that fuel is slowly drawn into fuel reservoir-agitator 15, 13b which creates a mist to be drawn into the chamber 6. When the demand for fuel and vacuum are decreased, excess fuel is slowly released from the chamber 6 back into the reservoir-agitator 15, 13b, making it available for the next demand for more fuel. An accelerator butterfly valve 12 may control the flow of fuel-air mixture to the engine (not shown) via an engine attachment port 31. A drain plug 18 may permit water and debris to be drained from the reservoir-agitator 15, 13b.

The fuel to air ratio automatically changes to the setting required by the current vacuum within the evaporator. The air is less dense in the evaporator because the air intake is restricted. Therefore, the air has to increase its velocity to maintain the vacuum. Since the fuel input orifice is smaller than the air input orifice, the vacuum pulls in correspondingly less fuel than air and the ratio changes as the velocity of air increases or decreases when passing over the fuel input orifice and the air input orifice.

A cap 9 may be used to seal the top of chambers 6, 7. A sealing gasket 10 may be applied to the cap 9 to create an air-tight seal between the cap 9 and the chambers 6, 7. A spring 11 may hold the cap 9 in place. A starter fuel hole 19 may be disposed in the cap 9 to permit starting fuel to be added to the chamber 6. A hole seal plug 19a may seal the starter fuel hole 19.

Referring to FIG. 2, the carburetor may include an air input 20, an air adjustment 22 to adjust a carburetor butterfly valve 23. A fuel adjustment 21 may control a needle valve 32 to control the amount of fuel mixing with air. A carburetor fuel container 33 may have a fuel level 24 maintained by a float (not shown). A fuel input tube 34 may deliver fuel through a fuel air mixing jet 25. The fuel-air mixture may pass out of a port 26 to the chamber 6. A crankcase vent input 35 may connect the air input 20 to the crankcase (not shown) of the engine.

Referring to FIG. 3, an air resistance plug 14 may provide a means to adjust the resistance of air into and out of the chamber 15. The tube 13 may connect the plug with a reservoir connection port 17. The plug 14 may also be used at an end of a tube-shaped reservoir-agitator 13b (FIG. 6). A support 13a may support the end of a tube 13.

Referring to FIG. 8, the chamber 6 may include course steel shavings 27 and fine steel shavings 28. The shavings grade combination may vary from one grade to any ratio of course to fine. Plastic filters 29 may be provided to filter out larger particles that might loosen from the steel shavings. Magnets 30 may be designed to catch and retain any smaller metal particles that could harm the engine.

It should be understood, of course, that the foregoing relates to exemplary embodiments of the invention and that modifications may be made without departing from the spirit and scope of the invention as set forth in the following claims.

What is claimed is:

1. A fuel evaporator comprising:
    a heat jacket;
    a fuel evaporation chamber disposed in the heat jacket;
    a heat input tube adapted to deliver heat into the heat jacket;
    a carburetor attachment port adapted to receive a fuel air mixture from a carburetor; and
    a reservoir-agitator adapted to provide additional fuel to the fuel evaporation chamber when needed.

2. The fuel evaporator of claim 1, wherein the fuel evaporation chamber includes steel shavings.

3. The fuel evaporator of claim 2, wherein the steel shavings include coarse steel shavings and fine steel shavings.

4. The fuel evaporator of claim 2, wherein the fuel evaporation chamber includes one or more filters and one or more magnets.

5. The fuel evaporator of claim 1, further comprising:
    a cap adapted to seal an end of the fuel evaporation chamber; and
    one or more springs to resiliently hold the cap onto the end of the fuel evaporation chamber.

6. The fuel evaporator of claim 1, further comprising an evaporated gas storage chamber fluidly connected with the fuel evaporation chamber, the evaporated gas storage chamber being stored in the heat jacket.

7. The fuel evaporator of claim 1, wherein the reservoir-agitator is a cup-shaped container disposed below the fuel evaporation chamber and fluidly connected to the fuel evaporation chamber via a fuel input orifice.

8. The fuel evaporator of claim 1, wherein the reservoir-agitator is a tube adapted to store fuel and deliver fuel to or receive fuel from a fuel input orifice fluidly attached to the fuel evaporation chamber.

9. A system for delivering a fuel-air mixture to an engine, comprising:
    a carburetor having:
        a fuel ratio adjustment nut to adjust a needle valve to regulate flow of fuel;
        an air ratio adjustment nut to adjust the flow of air through the carburetor; and
        a fuel container adapted to store fuel; and
    a fuel evaporator having:
        a heat jacket;
        a fuel evaporation chamber disposed in the heat jacket;
        a heat input tube adapted to deliver heat into the heat jacket;
        a carburetor attachment port adapted to receive a fuel air mixture from the carburetor; and
        a reservoir-agitator adapted to provide additional fuel to the fuel evaporation chamber when needed.

10. The system of claim 9, wherein the fuel evaporation chamber includes steel shavings, one of more filters, and one or more magnets.

* * * * *